United States Patent
McEwen et al.

(10) Patent No.: US 7,823,385 B2
(45) Date of Patent: Nov. 2, 2010

(54) TURBOCHARGER WITH WASTEGATE

(75) Inventors: James Alexander McEwen, Brighouse (GB); Andrew P. Day, Huddersfield (GB)

(73) Assignee: Holset Engineering Company, Ltd., Huddersfield (GB)

( * ) Notice: Subject to any disclaimer, the term of this patent is extended or adjusted under 35 U.S.C. 154(b) by 0 days.

(21) Appl. No.: 11/656,785

(22) Filed: Jan. 23, 2007

(65) Prior Publication Data

US 2007/0209363 A1 Sep. 13, 2007

Related U.S. Application Data

(63) Continuation of application No. 11/050,333, filed on Feb. 3, 2005, now Pat. No. 7,165,401, which is a continuation of application No. 10/139,056, filed on May 3, 2002, now abandoned.

(30) Foreign Application Priority Data

May 11, 2001 (GB) ................................. 0111681.3

(51) Int. Cl.
| | |
|---|---|
| F02D 23/00 | (2006.01) |
| F15B 13/16 | (2006.01) |
| F16K 1/22 | (2006.01) |
| F02B 37/18 | (2006.01) |
| F02B 39/00 | (2006.01) |

(52) U.S. Cl. ............................. 60/602; 91/372; 91/374; 92/137; 92/42

(58) Field of Classification Search .................. 60/602; 92/137, 42; 91/372, 374; 417/34; 251/305, 251/294, 285; 74/500.5
See application file for complete search history.

(56) References Cited

U.S. PATENT DOCUMENTS

| | | | |
|---|---|---|---|
| 2,520,678 A | 8/1950 | Findley | 15/250.17 |
| 2,543,927 A | 3/1951 | Montgomery | 91/374 |

(Continued)

FOREIGN PATENT DOCUMENTS

EP 0 125 959 A1 11/1984

(Continued)

*Primary Examiner*—Thai Ba Trieu
(74) *Attorney, Agent, or Firm*—Krieg DeVault LLP; J. Bruce Schelkopf, Esq.

(57) ABSTRACT

This invention relates to an actuator assembly for a turbocharger pressure control valve assembly and a method of assembling a pressure control assembly of a turbocharger. The assembly comprises an actuator coupled to an actuator rod which in use is coupled to the valve assembly to control the position thereof. The actuator rod comprises an elongate member at least a portion of which is flexible. The actuator rod may be a resilient member which may be substantially straight when stressed. In use the actuator rod may extend in a substantially straight line between the actuator and the valve assembly.

14 Claims, 3 Drawing Sheets

U.S. PATENT DOCUMENTS

| | | | | |
|---|---|---|---|---|
| 3,028,842 A | | 4/1962 | Dobrikin at al. | 92/137 |
| 3,269,272 A | | 8/1966 | Rager et al. | 92/137 |
| 3,289,491 A | * | 12/1966 | Conrad | 74/502.4 |
| 3,498,319 A | | 3/1970 | Schnabel | 137/375 |
| 3,756,747 A | | 9/1973 | Caffrey | 417/34 |
| 3,904,172 A | | 9/1975 | Baumann | 251/305 |
| 4,177,691 A | * | 12/1979 | Fillmore | 74/502.4 |
| 4,508,008 A | | 4/1985 | Belart | 91/372 |
| RE31,956 E | | 7/1985 | Deck | 251/294 |
| 4,656,834 A | | 4/1987 | Elpern | 60/602 |
| 4,669,264 A | * | 6/1987 | Kobelt | 91/368 |
| 4,777,868 A | | 10/1988 | Larsson | 92/42 |
| 4,780,054 A | * | 10/1988 | Yano et al. | 415/161 |
| 4,927,325 A | * | 5/1990 | Yano | 415/161 |
| 5,172,552 A | | 12/1992 | Elpern et al. | 60/602 |
| 5,868,554 A | | 2/1999 | Giacomino et al. | 92/137 |
| 6,883,318 B2 | | 4/2005 | Warner et al. | 60/602 |
| 2005/0241309 A1 | | 11/2005 | McEwen et al. | 60/602 |
| 2007/0093366 A1 | * | 4/2007 | Zuckerman | 482/121 |

FOREIGN PATENT DOCUMENTS

| | | |
|---|---|---|
| EP | 0 523 859 A1 | 1/1993 |
| EP | 0 976 919 A2 | 2/2000 |
| JP | 59131727 | 7/1984 |
| JP | 10213102 A * | 8/1998 |
| WO | WO 89/03329 | 4/1989 |

\* cited by examiner

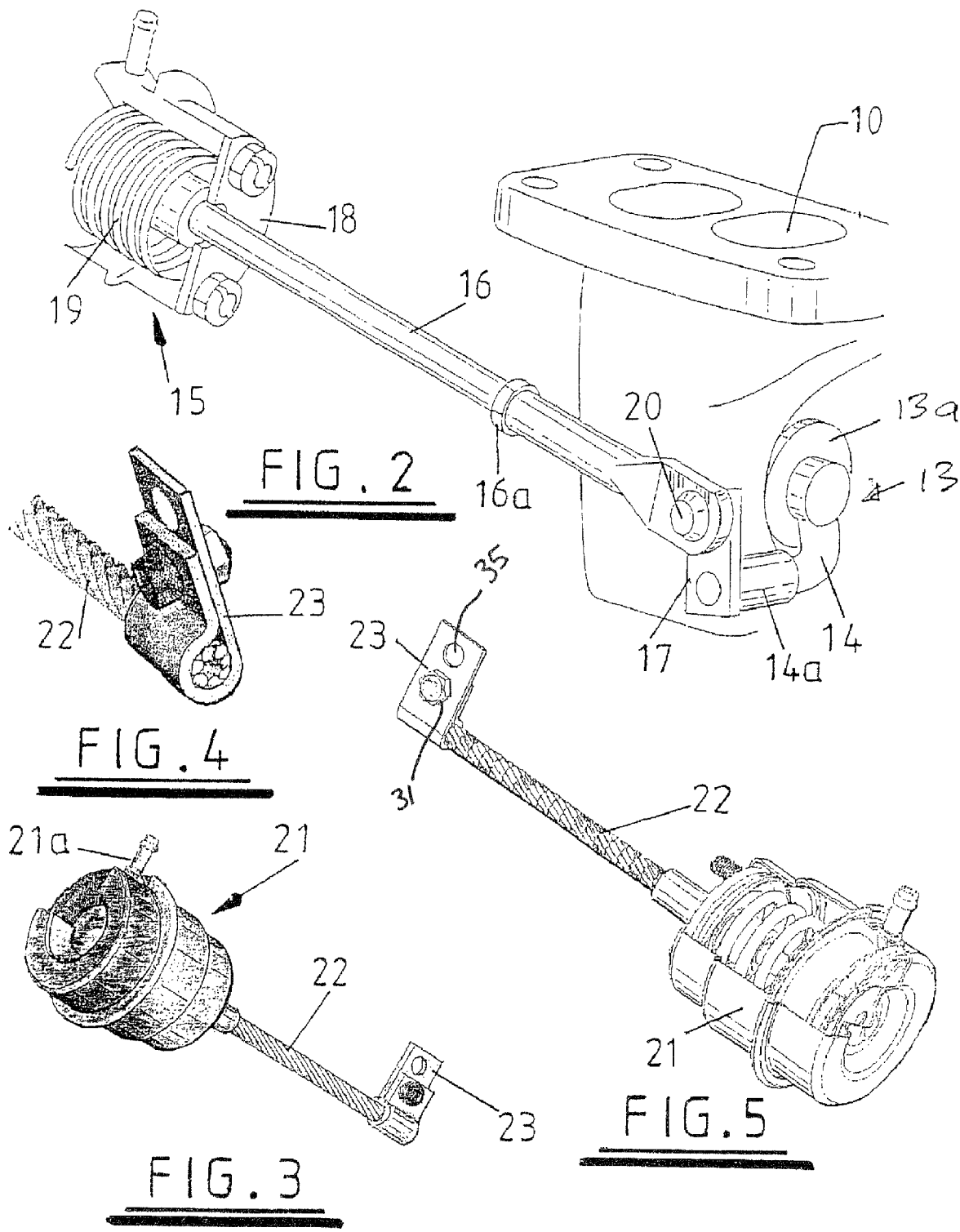

TURBOCHARGER WITH WASTEGATE

The present application is a continuation of U.S. patent application Ser. No. 11/050,333 filed Feb. 3, 2005, now U.S. Pat. No. 7,165,401, which is a continuation of U.S. patent application Ser. No. 10/139,056 filed May 3, 2002 now abandoned, which claims priority to United Kingdom Application No. 0111681.3 filed May 11, 2001, each of which is incorporated herein by reference.

FIELD OF THE INVENTION

This invention relates to a turbocharger incorporating a wastegate and wastegate actuator, and in particular relates to the manner in which the actuator is connected to the wastegate.

BACKGROUND OF THE INVENTION

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. For instance, in a centripetal turbine the turbine housing defines an annular inlet passageway around the turbine wheel and a generally cylindrical axial outlet passageway extending from the turbine wheel. Rotation of the turbine wheel rotates a compressor wheel mounted on the other end of the shaft within a compressor housing. The compressor wheel delivers compressed air to the intake manifold of the engine, thereby increasing engine power.

Turbochargers incorporating wastegates are also well known. A wastegated turbocharger has a bypass passageway between the exhaust inlet and exhaust outlet portions of the turbine housing to enable control of the turbocharger boost pressure. A wastegate valve is located in the passageway and is controlled to open the passageway when the pressure level of the boost air increases to a predetermined level, thus allowing some of the exhaust gas to bypass the turbine wheel preventing the boost pressure from rising further. The wastegate valve is generally actuated by a pneumatic actuator operated by boost air pressure delivered by the compressor wheel. The position of the wastegate valve, and thus the amount of exhaust gas permitted to bypass the turbine wheel, is thus controlled in direct response to variations in the boost pressure.

A conventional pneumatic actuator comprises a spring loaded diaphragm or sliding seal housed within a canister (referred to as the wastegate actuator can) which is mounted to the compressor housing. The diaphragm seal acts on a connecting rod which actuates the wastegate valve assembly which is mounted in the turbine housing.

The actuator can is connected to the compressor outlet via a hose to deliver boost air to the can which acts on the diaphragm (or sliding seal) to oppose the spring bias. The spring is selected, and the actuator and wastegate valve initially set, so that under low boost conditions the wastegate valve remains closed. However, when the boost pressure reaches a predetermined maximum the diaphragm seal is moved against the action of the spring and operates to open the wastegate valve (via the connecting actuator rod) thereby allowing some exhaust gas to bypass the turbine wheel.

In conventional arrangements the wastegate valve is mounted on a valve stem which extends through the turbine housing and which is rotated to open and close the valve. Rotation of the valve stem is achieved by the reciprocal motion of the actuator rod via a lever arm which links the end of the actuator rod to the valve stem. To accommodate the motion of the actuator rod there is a pivotable joint between the lever arm and the actuator rod, the opposite end of the actuator level being secured (typically by welding) to the end of the valve stem. For accurate operation of the actuator it is also important that the diaphragm seal maintains alignment within the canister, and thus that the rod maintains its alignment along the axis of the actuator can. It is therefore known to design the pivotal joint between the actuator rod and the lever arm to allow a slight amount of movement along the axis of the actuator lever to limit the tendency of the actuator rod to pulled off-line as it reciprocates.

The "lift off point", i.e. that pressure at which the wastegate valve begins to open, is critical to operation of the wastegate and therefore must be very carefully set when the actuator and wastegate are assembled to the turbocharger. The precise actuator can pressure at which the diaphragm begins to move is dependent upon the preload of the spring used. Unfortunately, because tolerances to which springs can practically be manufactured mean that there can be variations in spring rate from one spring to the next, it is necessary to set the lift off point of each turbocharger individually.

One method of carrying out the initial set up of the conventional actuator assembly described above, is a process known as "weld to set". The actuator can, actuating rod and actuator lever are pre-assembled, and mounted to the turbocharger. The wastegate valve is then clamped shut from within the turbine housing and the actuator can is pressurised to the desired lift off pressure. With the diaphragm, actuator rod and valve thus held in their respective relative positions immediately prior to lift off, the end of the actuator lever welded to the valve stem. Accordingly, any increase in the pressure supplied to the actuator above the predetermined lift off pressure will cause the valve to open.

A known alternative to the above is to use an adjustable length actuator rod, typically comprising a threaded rod and rod end. The set point is achieved by adjusting the length of the rod, either by turning the rod end or a nut captured in the rod end assembly.

European patent publication number 0 976 919 discloses a two-part actuator rod which overcomes many of the disadvantages of the conventional actuator rod described above. The two parts of the rod are connected via a spherical joint located towards the wastegate end of the rod which allows rotational freedom between the end of the rod connected to the actuator and the end of the rod connected to the actuator lever. This arrangement greatly simplifies initial set up by obviating the need to pre-assemble the lever to the actuator rod (the lever instead being pre-assembled to the wastegate valve stem) or the need to provide an adjustable length rod. However, both of the above actuator assemblies suffer the disadvantage that the respective pivotable joints add to the component cost and provide a site for wear to occur.

OBJECT OF THE INVENTION

Accordingly, it is an object of the present invention to provide an actuating assembly for a turbocharger wastegate which overcomes problems associated with conventional arrangements discussed above. In particular it is an object of the present invention to provide an improved actuator rod.

SUMMARY OF THE INVENTION

According to a first aspect of the present invention there is provided an actuator assembly for a turbocharger pressure control valve assembly, the actuator assembly comprising an actuator coupled to an actuator rod which in use is coupled to the valve assembly to control the position thereof, wherein the actuator rod comprises an elongate member at least a portion of which is flexible.

According to a second aspect of the present invention there is provided a turbocharger including a pressure control assembly comprising an actuator, a valve assembly, and an actuating rod connected between the actuator and the valve assembly, the actuator controlling operation of the valve assembly via the actuator rod, wherein the actuator rod comprises an elongate member at least a portion of which is flexible.

Preferably the actuator rod comprises a multi-strand cable e.g. a steel cable.

The provision of a flexible actuator rod offers a number of advantages over conventional rigid actuator rods as is discussed in more detail in the following description. It is to be understood that the degree of flexibility could vary from one embodiment of the invention to another. Preferably the rod is sufficiently flexible to flex under normal operating conditions as it moves to actuate the valve assembly, but not, for instance, to flex significantly under force of gravity if held at one end only. The rod need not be flexible along its entire length although preferred embodiments are flexible at least along a substantial portion of the length of the rod.

According to a third aspect of the present invention there is provide a method of assembling a pressure control assembly of a turbocharger, the turbocharger comprising a turbine housing and a compressor, the pressure control assembly comprising a valve assembly mounted within the turbine housing, a pneumatic actuator mounted to the turbocharger to receive pressurized air from the compressor or an external air supply, a flexible actuator rod extending from the pneumatic actuator, and a lever arm extending from the valve assembly and the turbine housing and linking the actuator rod to the valve assembly, the method comprising:

assembling the valve assembly and lever arm on the turbine housing;

assembling the pneumatic actuator and actuator rod as a sub-assembly;

mounting the pneumatic actuator/actuating rod sub-assembly to the turbocharger; and securing the end of the actuator rod remote from the pneumatic actuator to the lever arm.

BRIEF DESCRIPTION OF THE DRAWINGS

Specific embodiments of the present invention will now be described, by way of example only, with reference to the accompanying drawings, in which:

FIG. 2 illustrates details of a conventional turbocharger wastegate valve and actuator assembly;

FIG. 3 is a perspective view of a wastegate valve actuator assembly in accordance with an embodiment of the present invention;

FIG. 4 shows a detail of the actuator assembly of FIG. 3;

FIG. 5 is a further perspective view of the actuator assembly of FIG. 3, looking in the direction of arrow A on FIG. 3 and with part of the actuator can cut away to reveal internal detail.

DETAILED DESCRIPTION OF THE PREFERRED EMBODIMENT

Figure 1:
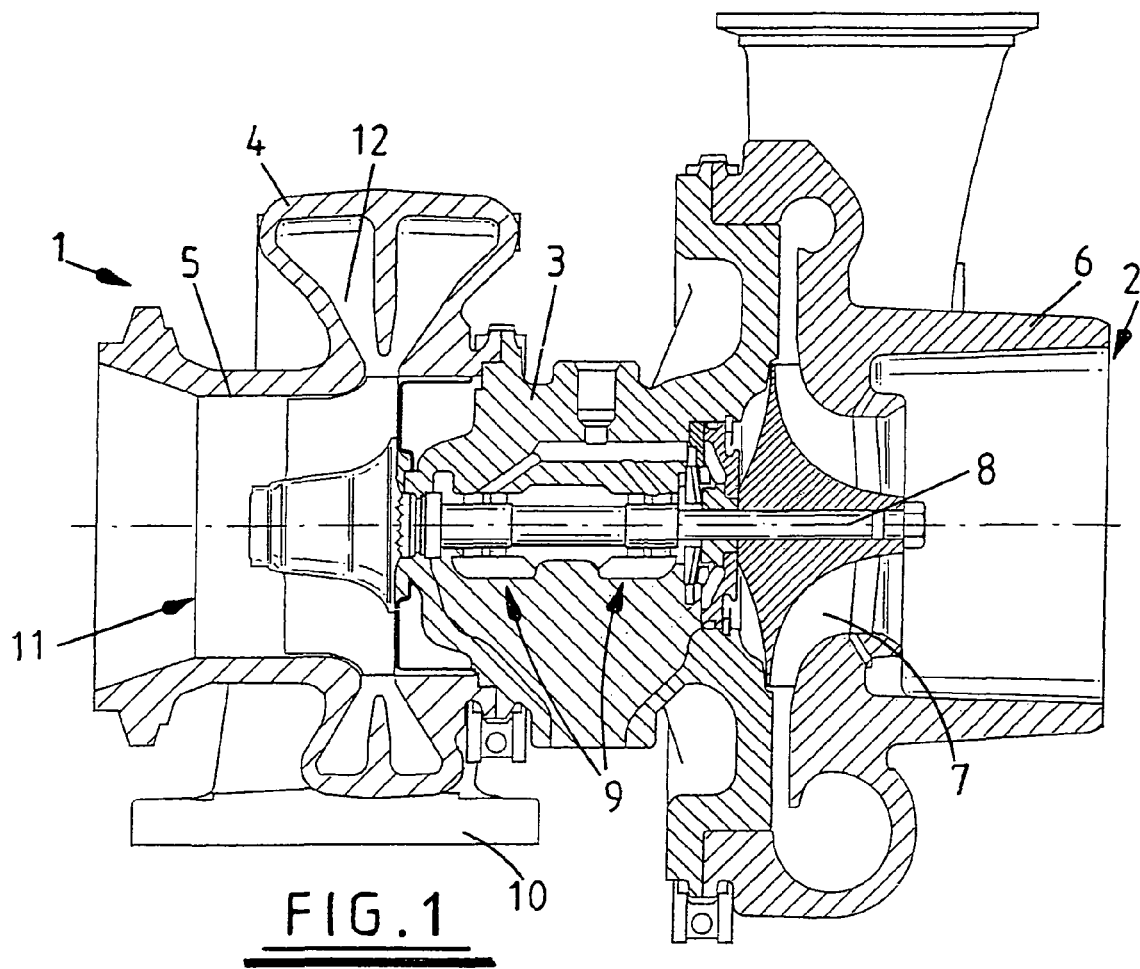
FIG. 1 is an axial cross-section through a conventional turbocharger illustrating the major components of a turbocharger.
Figure 6:
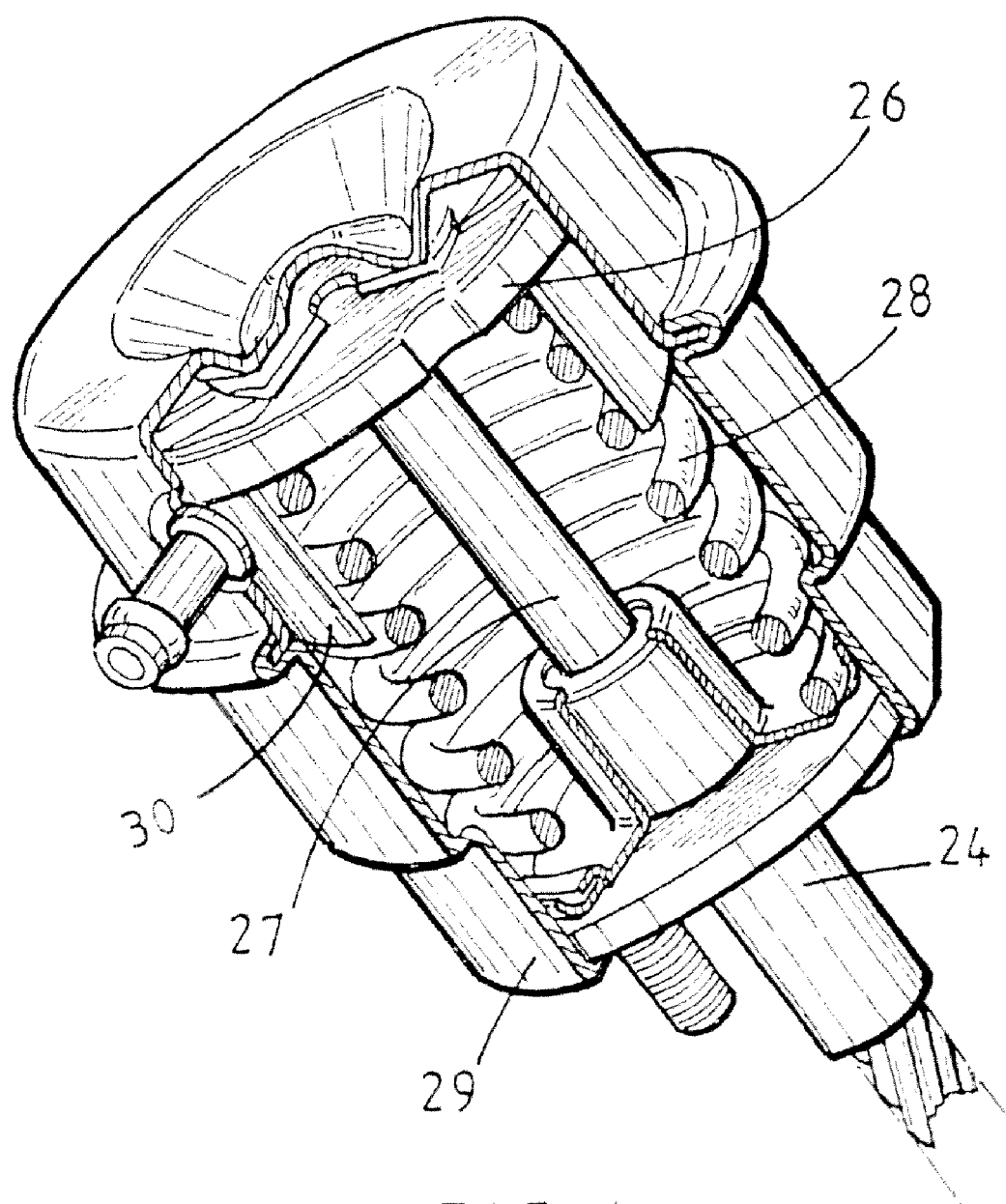
FIG. 6 shows internal details of the actuator can of FIGS. 4 and 5.

Referring first to FIG. 1, this illustrates the basic components of a conventional centripetal type turbocharger. The turbocharger comprises a turbine 1 joined to a compressor 2 via a central bearing housing 3. The turbine 1 comprises a turbine housing 4 which houses a turbine wheel 5. Similarly, the compressor 2 comprises a compressor housing 6 which houses a compressor wheel 7. The turbine wheel 5 and compressor wheel 7 are mounted on opposite ends of a common shaft 8 which is supported on bearing assemblies 9 within the bearing housing 3.

The turbine housing 4 is provided with an exhaust gas inlet 10 and an exhaust gas outlet 11. The inlet 10 directs incoming exhaust gas to an annular inlet chamber 12 which forms a volute surrounding the turbine wheel 5. The exhaust gas flows through the turbine and into the outlet 11 via a circular outlet opening which is coaxial with the turbine wheel 5.

Referring now to FIG. 2, this illustrates components of a conventional prior art wastegate valve and actuator assembly which is not visible from FIG. 1. The turbine housing 4 is provided with a bypass passageway (not shown) which communicates between the exhaust inlet 10 and the exhaust outlet 11 bypassing the turbine wheel 5. The bypass passageway communicates with the exhaust inlet 10 via a circular opening (not shown) which is opened and closed by a valve member 13a of a wastegate valve 13 provided for controlling the flow therethrough. In FIG. 2 the part of the turbine housing 4 defining the inlet 10 is shown partially cut away to reveal details of the wastegate valve 13 which is operated by rotation of a valve stem 14 which extends through a bush 14a in the turbine housing 5.

Rotation of the valve stem 14, and thus actuation of the wastegate valve 13, is achieved by an actuator assembly mounted on the outside of the turbocharger and comprising a spring loaded pneumatic actuator 15 which is linked to the valve stem 14 via a connecting rod 16 and actuating lever 17. The actuator can 18 receives compressed air from the outlet of the compressor 2 and thus is conventionally mounted to the outside of the compressor housing 6 by an appropriate bracket (not shown). Details of an appropriate mounting arrangement are omitted from FIG. 2 for simplicity but may be entirely conventional.

The actuator 15 comprises a diaphragm or sliding valve (e.g. piston), not shown, mounted within a cylindrical canister (the actuator can) 18 on one end of the actuator rod 16. The actuator rod 16 extends from the front of the actuator can 18 towards the turbine housing 4 and wastegate valve 13. In FIG. 2 the actuator can is shown cut away to reveal detail of a coil spring 19 mounted coaxially around the actuator rod 16 and acting between the diaphragm/sliding seal (not shown) and the front end of the actuator can 18. The coil spring 19 thus biases the actuator rod towards the rear of the actuator can 18.

The actuator rod connects the diaphragm/seal of the actuator 15 to the wastegate valve 13 via the lever arm 17. The end of the actuator rod 16 is connected to the actuator lever 17 via a pivotal connection 20 to allow relative movement between the two whereas the lever 17 is fixed to the valve stem 14, typically by welding as mentioned above.

In use, the wastegate valve 13 will in low boost conditions be held closed by the action of the spring 19. However, once the pressure in the compressor outlet reaches a predetermined limit, the pressurised air transmitted to the actuator 15 forces the diaphragm/seal to move against the action of the spring 19 thereby opening the wastegate valve 13 to allow inlet exhaust gas to bypass the turbine. In this way, the maximum boost pressure produced by the turbocharger can be controlled and limited.

In the illustrated example, the actuator rod 16 is of adjustable length. That is, the actuator rod 16 has two portions which can be moved relative to each other by rotation of an adjusting nut 16a to lengthen or shorten the rod. This allows the length of the rod to be adjusted at initial set up to ensure that at the "lift off" pressure, i.e. that pressure at which the valve begins to open, the actuator rod 16 is properly aligned with the axis of the actuator 15 (provided the actuator can is itself correctly mounted to the compressor).

FIGS. 3 to 6 illustrate an embodiment of an actuator assembly in accordance with the present invention which overcomes a number of disadvantages of the conventional arrangement described above. Essentially, the actuator assembly comprises a pneumatic actuator 21 an actuator rod 22 and an actuating lever 23. The actuator 21 may be entirely conventional and may be mounted to the compressor housing in a conventional way so as to receive air from the compressor outlet via an inlet pipe 21a. The fundamental differences between the actuator assembly of the invention and the conventional system described above lie in the nature of the actuating rod 22 and its manner of connection to the suitably modified lever 23.

In accordance with the invention, the actuating rod 22 is flexible, comprising in this embodiment a multi-strand steel cable. The actuator end of the rod 22 is secured within one end of a steel sheath 24 (for instance by crimping) the other end of which is secured to a piston rod 27 (again by crimping or welding etc). The piston rod 27 supports a piston 26 which is slidable along the axis of the actuating can 29. A coil spring 28 is mounted between the piston 26 and the front end of the actuating can 29 to bias the piston 26, and thus actuator rod 22, towards the rear of the actuator can 29 thereby holding the valve assembly in a closed position. The actuator is provided with an actuator rod guide 29 in the form of a cylindrical boss which receives the end of the sleeve 24 which extends into the actuator can 29. This ensures that the actuator rod is effectively orientated along the axis of the actuator can 29 at its point of entry into the actuator. This helps ensure that the force exerted on the piston rod 27, and thus piston 26, by the tension in the actuator rod 22 acts along the axis of the actuator can 29, i.e. in the direction of movement of the piston 26, even if the actuator is misaligned with the actuating lever 23. An additional guide 30 surrounds the piston 26 to further prevent the piston being pulled off-axis as it moves within the actuator can 29.

The opposite end of the actuator rod 22 is secured to the lever 23 which is formed as a clamp. Pressure is applied to the end of the actuator rod 22 to hold it firmly in position by tightening a clamping nut 24. The lever 23 further defines an aperture 25 enabling connection of the lever arm to the wastegate valve stem, for instance by the conventional method of welding the lever to the valve stem 14.

The actuator assembly of FIG. 3-6 is assembled in the following manner.

a. The valve assembly and lever arm are assembled on the turbine housing;

b. The pneumatic actuator and actuator rod are assembled as a sub-assembly;

c. The pneumatic actuators/actuating rod sub-assembly is mounted to the turbocharger.

d. The valve assembly is held in a closed position by appropriate clamping of the lever arm, the pneumatic actuator is pressurized to a predetermined pressure, thereby to determine the minimum pressure at which the valve will in use begin to open; and e. Subsequently securing the end of the actuator rod remote from the pneumatic actuator to the lever arm.

Provision of a flexible actuator rod in accordance with the invention is based on the realisation that the actuator rod is in fact always in tension since the wastegate valve is always biased towards an open position against the action of the actuator spring by the gas pressure within the exhaust gas inlet. Thus, when moving the valve from a closed to an open position it is not actually necessary to push the valve open (as with the action of a conventional rigid actuator rod) but rather simply to allow the valve to open under the pressure of the exhaust inlet gas. Adoption of a flexible actuator rod therefore has no detrimental effect on the basic operation of the actuator assembly and instead provides a number of benefits over conventional rigid actuating rods.

The ability of the actuator rod to flex obviates the need to provide a pivotal connection between the actuator rod and the actuating lever as with the conventional arrangement described above, or to provide a spherical joint as with the actuator rod described in European patent publication number 0 976 919 (as mentioned above). This reduces the number of components needed in manufacture of the actuating assembly and removes the pivotal joints which can wear during use.

The need for an adjustable length actuator rod is also obviated since the effective length of the rod (i.e. the length of the rod extending between actuating the lever and the actuator) is determined at set up.

The flexible nature of the actuator rod allows for a certain degree of miss-alignment between the actuator 15 and the wastegate valve assembly without exerting significant off-axis force on the actuator diaphragm/sliding seal etc. This further reduces the cost and complexity of manufacture by increasing manufacturing tolerances of the various components and simplifying assembly.

A further significant advantage of a flexible actuating rod is that it can provide a degree of damping between the wastegate valve assembly and the actuator. In the particular embodiment described in which the actuator rod is a multi-strand cable, energy is dissipated through friction as strands of the cable rub together as the cable flexes. This damps the vibration caused by fluttering of the wastegate valve as the pressure within the exhaust gas inlet which fluctuates is a recognised problem of conventional wastegate actuator assemblies.

It will be appreciated that many modifications may be made to the embodiment of the invention described above. For instance, the actuator rod end may be connected to the actuating lever by any appropriate means and not just by clamping as illustrated. Preferred means allow the effective length of the actuator rod to be determined at initial set up and include alternatives such as welding (or otherwise bonding) or crimping. The actuator lever itself can be of any desired configuration suitable for the chosen connection method and the location of the valve assembly.

The actuator rod itself need not be a multi-strand steel cable. Multi-strand cables are preferred because of the improved damping offered by interaction of the cable strands. However, other cable materials may be employed including other metals and synthetic materials including plastics fibres. The cable may for instance be a composite of fibres of different materials.

As mentioned above, the actuator rod need not be a cable but could comprise an essentially single piece rod but having the required flexibility. Such a rod may have the dimensions of a conventional rod but be fabricated from material with the required inherent flexibility. Alternatively, a suitable rod can be manufactured from a conventional material, such as steel, but made thinner than a conventional rod to again provide the required flexibility. The appropriately skilled person will appreciate the many possible variations.

Moreover, the rod need not be flexible along its entire length. For instance a rod comprising one or more flexible portions joined to one or more rigid sections could be used. An essentially single piece flexible rod, possibly with connecting end pieces (such as the sleeve 24 of the illustrated example), is however preferred for mechanical simplicity.

As mentioned above, the actuator may be entirely conventional. However, in the illustrated embodiment the actuator is modified by the provision of the actuator rod guide 29 and piston guide 30. It will be appreciated that the exact form of these guides may vary considerably. Furthermore one or both of these guides could be omitted, particularly if steps are taken to ensure the actuator is correctly aligned with the actuator lever as with conventional assemblies. In addition, whereas in the illustrated example the actuator rod 22 is connected to the piston 26 via a piston rod 27 it will be appreciated that the actuator rod 22 could extend through the sleeve 33 and be connected directly to the piston. Indeed, the sleeve 33 could be omitted entirely.

Again, it will be appreciated that many modifications could be made to the detailed design of the actuator can. For instance, the sliding piston actuator could be replaced by a diaphragm actuator. Other possible modification will be readily apparent to the appropriately skilled person.

Having thus described the invention, what is novel and desired to be secured by Letter Patent of the United States is:

The invention claimed is:

1. An actuator assembly for a turbocharger having a turbocharger pressure control valve assembly, the actuator assembly comprising an actuator coupled to an elongated flexible actuator rod at least a portion of which is flexible, an actuating lever having an end coupled to said actuator rod and another end coupled to the valve assembly to control the position thereof, said actuator rod being substantially unrestrained between said actuating lever and said actuator and the position of the actuating lever on the actuator rod is capable of being adjusted;
wherein the actuator rod comprises a sleeveless cable.

2. The actuator assembly according to claim 1, wherein the actuator rod is a resilient member.

3. The actuator assembly according to claim 2, wherein the actuator rod is substantially straight when unstressed.

4. The actuator assembly according to claim 1, wherein in use the actuator rod extends in a substantially straight line between the actuator and the valve assembly.

5. The actuator assembly according to claim 1, wherein the actuator rod comprises a multi-strand cable.

6. The actuator assembly according to claim 1, wherein the actuator is a pneumatic actuator.

7. The actuator assembly according to claim 6, wherein the pneumatic actuator comprises a spring loaded diaphragm or sliding seal housed within a pressure chamber, said diaphragm or seal being attached to a first end of the actuator rod.

8. The actuator assembly according to claim 7, wherein said pressure chamber is provided with a guide formation adapted to direct force exerted by the actuator rod on the diaphragm/sliding seal along the direction of movement thereof.

9. The actuator assembly according to claim 8, wherein said guide comprises a boss surrounding an opening through which the actuator rod extends into the pressure chamber.

10. The actuator assembly according to claim 9, wherein the actuator comprises a sliding seal mounted within said pressure chamber, and said sliding seal is provided with guide means to resist any forces tending to pull the sliding seal of its intended direction of movement.

11. A turbocharger comprising:
a turbocharger including a turbine having a turbine wheel rotatable within a housing;
a bypass passageway operable to allow exhaust gas to bypass the turbine wheel;
a valve operable to control fluid flow through the bypass passageway, said valve having a closed state and an open state;
a lever coupled to the valve;
a pneumatic actuator; and
a flexible member coupled to the pneumatic actuator and coupled to the lever to change the state of the valve in response to the pneumatic actuator, wherein there is no relative movement between the flexible member and the lever at the point of connection.

12. The system of claim 11, wherein the flexible member comprises a multi-strand cable.

13. The system of claim 11, wherein the valve is a wastegate valve.

14. The system of claim 11, wherein the valve is biased towards an open position by the exhaust gas.

* * * * *